A. CALLEBERT.
BURNISHING TOOL.
APPLICATION FILED MAY 5, 1921.
1,429,403.
Patented Sept. 19, 1922.
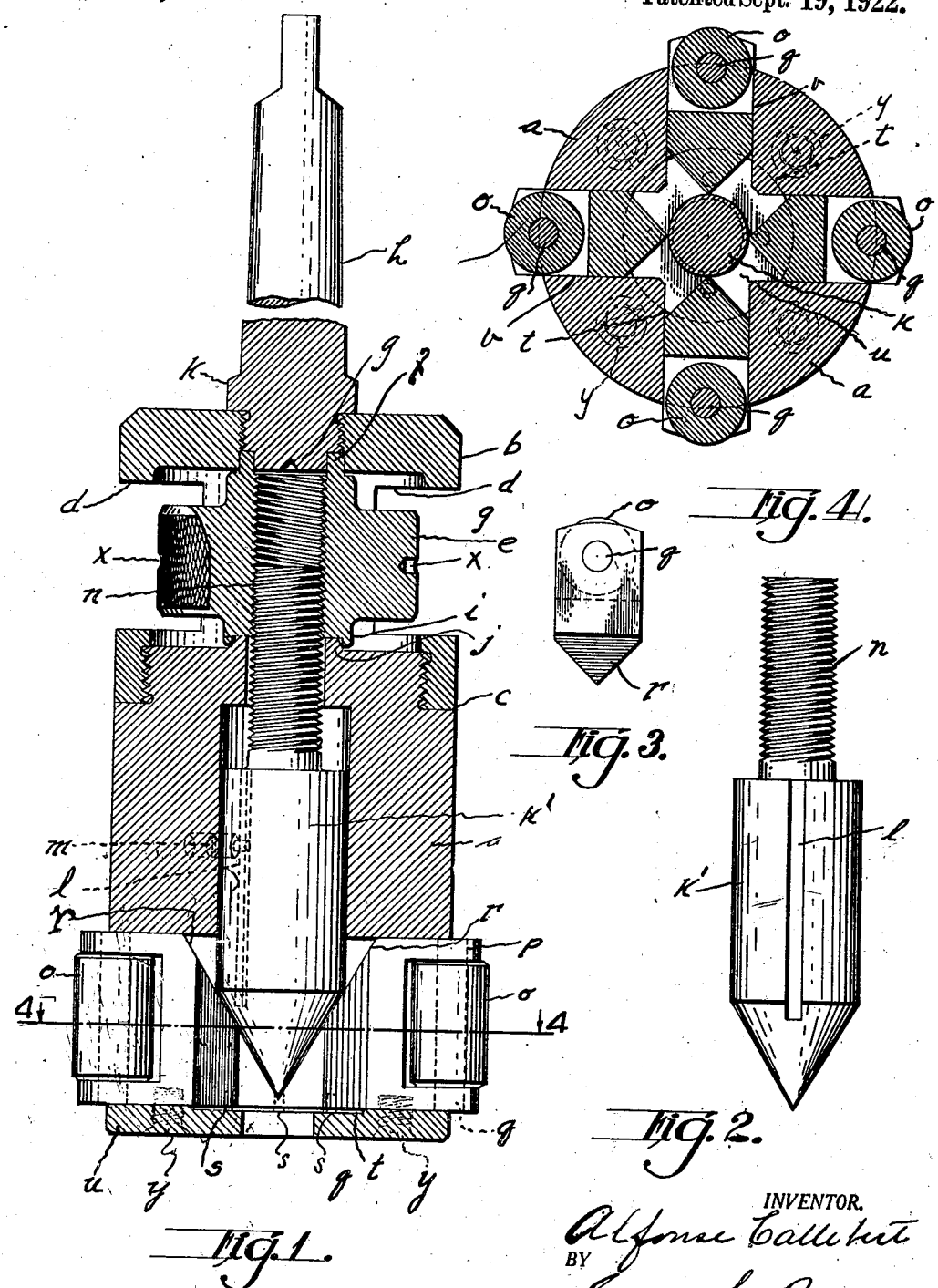
INVENTOR.
Alfonse Callebert
BY
Stuart C. Barnes
ATTORNEY.

Patented Sept. 19, 1922.

1,429,403

UNITED STATES PATENT OFFICE.

ALFONSE CALLEBERT, OF JACKSON, MICHIGAN, ASSIGNOR TO REX MACHINE TOOL COMPANY, OF JACKSON, MICHIGAN, A CORPORATION OF MICHIGAN.

BURNISHING TOOL.

Application filed May 5, 1921. Serial No. 467,075.

*To all whom it may concern:*

Be it known that I, ALFONSE CALLEBERT, a subject of the King of Belgium, residing at Jackson, in the county of Jackson and State of Michigan, have invented certain new and useful Improvements in Burnishing Tools, of which the following is a specification.

This invention relates to burnishing tools, especially tools intended for burnishing internal combustion engine cylinders.

It is the object of the present invention to provide an improved tool of this type.

In the drawings,—

Fig. 1 is a longitudinal section of the tool.

Fig. 2 is an elevation of the tapered spreading pin.

Fig. 3 is a plan view of one of the burnishing rolls.

Fig. 4 is a section on the line 4—4 of Fig. 1.

The tool is made up of a cylinder $a$ and a barrel $b$ that screw together at $c$ to form what amounts to practically an invisible joint. The barrel or body member $b$ has a hollow interior with two large slots $d$ cut in the side to permit the operator's fingers to have access to the knurled adjusting nut $e$. This adjusting nut is provided with a hub $f$ which engages around the stud-like end $g$ of the tang $h$. The nut is also provided with a hub $i$ that engages around the boss $j$ projecting inwardly from the outer cylinder $a$.

The tang $h$ has a shoulder $k$ and is provided with external threads between this shoulder and the stud-like end of the tang. This permits the tang to be screwed in the end of the barrel $b$, and when so screwed in place the nut $e$ becomes rotatably supported on the two bearing members $g$ and $j$.

The cylinder $a$ has a hollow interior of smaller diameter than the interior of the barrel. This acts as a guide for the tapered pin $k'$ which has a key-way $l$ cut in one side which engages with the end of the set screw key $m$. This prevents the tapered pin from turning. Obviously when the nut $e$ is turned upon its bearings, the threaded stem $n$ of the tapered pin engaging the threads of the nut, this tapered pin is caused to travel longitudinally within the body of the tool. This causes the rolls $o$ that are rotatably supported on the pins $q$ on the sliding carriages $p$ to spread as the tapered pin moves outwardly. This spreading action is caused by reason of the back of the carriages being chamfered as at $r$. The conical end of the tapered pin engages against these chamfered carriage backs and forces the carriages outwardly. Into the ends of these carriages are driven the pins $s$ which engage in the counterbore seat $t$ of the cap plate $u$. This counterbore wall acts as a stop in connection with the pins $s$ to prevent the rolls dropping out of the slots $v$ in which they travel. There are four of these rolls and carriages.

The tool may be inserted in the work with the cylinder projected into the work. The knurled nut $e$ may then be turned to project the burnishing rolls outwardly and a tool may be inserted in the openings $x$ in the knurled nut to force the burnishing rolls tightly against the work. The carriages fit accurately within their guide slots $v$ and have yoke-like arms to give support to the rolls at both ends.

When the cap plate $u$ has been taken off by loosening the screws $y$ that screw into the post-like portions of the cylinder $a$, the burnishing rolls and carriages are free to drop out of their slots. The tapered pin may be taken out by turning the nut until it lets go of the threads of the tapered pin threaded stem $n$. The nut $e$ can only be disassembled when the cylinder and barrel that form the body are screwed apart, which will seldom be necessary, if ever.

From the above description it will be seen that a simple assembly of a few parts serves to lock the operating or moving parts of the tool in their relative position. The cap plate $u$ and the cylinder $a$ constitute what, in the claims, I term the body.

What I claim is:

1. In a tool for the purpose specified, the combination of a hollow body member, a reciprocating spreader guided longitudinally therein and provided with a threaded stem projecting out of one end of the body member, a projecting boss or bearing encircling said threaded stem and projecting from the end of the body member, a barrel having a hollow interior provided with a projecting stud or bearing, the said barrel provided with slots in its side and having means for detachably engaging the end of the body member, and a nut rotatably locked in place upon the said boss and the said stud and in engagement with the threads of the spreader stem, when the barrel is engaged with the body member.

2. In a tool for the purpose specified, the combination of a body member provided with a projecting boss, a tapered pin guided longitudinally therein and provided with a threaded stem that projects through said boss, a barrel provided with slotted sides and detachably engaging with the inner end of the body member, and a tang screwing into the barrel and provided with a projecting end portion or bearing, and an adjusting nut having hub portions adapted to rotatably engage the boss and the projecting end portion of the tang when the barrel and body member are locked together and adapted to screw onto the threads of the tapered pin spreader.

3. In a tool for the purpose specified, the combination of a hollow body member, a tapered pin guided longitudinally therein, means for forcing the tapered pin longitudinally, the said body provided with slots at the side, a plurality of carriages radially slidable in said slots and forced radially by the said pin, a cap plate removably engaging the end of the body member and provided with means engaging portions of the carriage to act as stops for the carriages in their outward movement, and burnishing rolls carried by the said carriages.

4. In a tool for the purpose specified, the combination of a hollow body member, a tapered pin guided longitudinally therein, means for forcing the tapered pin longitudinally of the body member, said body member provided with radially-directed slots, carriages slidable in said slots and spread by the said pin, burnishing rolls supported upon the said carriages each of said carriages being provided with a pin, and a plate removably secured to the end of the body member and having a counterbore on its inside in which the projecting pins of the carriages engage to prevent the carriages from dropping out of their slots.

5. In a tool for the purpose specified, the combination of a body, carriages slidable radially therein, burnishing rolls rotatably supported by said carriages, a tapered pin for engaging said carriages to force the same outwardly, the pin having a threaded shank at one end, a slotted barrel screwing into the end of the body, a nut trapped in the barrel between the end of the barrel and the end of the body and engaging the threaded shank of the pin, and means for preventing the tapered pin turning.

In testimony whereof I affix my signature.

ALFONSE CALLEBERT.